(12) United States Patent
Holloway et al.

(10) Patent No.: US 9,273,825 B1
(45) Date of Patent: Mar. 1, 2016

(54) MODULAR ITEM HOLDER AND CLAMP

(71) Applicant: Lighthouse Industries, Inc., Michigan City, IN (US)

(72) Inventors: Todd J. Holloway, Michigan City, IN (US); Stephen O. Slatter, Naples, FL (US)

(*) Notice: Subject to any disclaimer, the term of this patent is extended or adjusted under 35 U.S.C. 154(b) by 0 days.

(21) Appl. No.: 14/694,378

(22) Filed: Apr. 23, 2015

Related U.S. Application Data

(62) Division of application No. 13/869,367, filed on Apr. 24, 2013, now abandoned.

(51) Int. Cl.
| | |
|---|---|
| *F16L 3/08* | (2006.01) |
| *F16L 3/12* | (2006.01) |
| *F16M 13/02* | (2006.01) |
| *F41B 11/83* | (2013.01) |

(52) U.S. Cl.
CPC .............. *F16M 13/022* (2013.01); *F41B 11/83* (2013.01)

(58) Field of Classification Search
CPC .............................. F16M 13/022; F41B 11/83
See application file for complete search history.

(56) References Cited

U.S. PATENT DOCUMENTS

| | | | |
|---|---|---|---|
| 2002/0000498 A1* | 1/2002 | Workman | F16L 3/24 248/62 |
| 2007/0145198 A1* | 6/2007 | Miller | F16L 55/035 248/72 |
| 2012/0132761 A1* | 5/2012 | Elsmore | H02G 3/32 248/74.1 |

* cited by examiner

*Primary Examiner* — Amy Sterling
(74) *Attorney, Agent, or Firm* — Malin Haley DiMaggio & Bowen, P.A.

(57) ABSTRACT

A modular clamp for storing a spear gun or other items on a marine vessel comprising a fixed clamp arm and a pivoting movable clamp arm, wherein the fixed clamp arm and the pivoting movable clamp arm define an openable clamp releasably receiving one or more items. A support block extends from the rear of the fixed clamp arm and a pressure spring is disposed between an outside wall of the pivoting movable clamp arm and the support block. The pivoting movable clamp arm pivots with respect to the fixed clamp arm and the pressure spring provides for resilient closure of the clamp. A strap is provided to lock the clamp closed.

4 Claims, 5 Drawing Sheets

MODULAR ITEM HOLDER AND CLAMP

CROSS REFERENCE TO RELATED APPLICATIONS

This application is a divisional of co-pending U.S. application Ser. No. 13/869,367 filed on Apr. 24, 2013.

STATEMENT REGARDING FEDERALLY SPONSORED RESEARCH OR DEVELOPMENT

N/A

BACKGROUND OF THE INVENTION

1. Field of the Invention

The present invention generally relates generally to modular items holder hardware and more particularly to a modular item clamp and holder for use on a marine vessel.

2. Description of Related Art

Diving and fishing boats are often equipped with various compartments, clamps, clips, and related accessories for securing items to the vessel during operation of the vessel at sea. Particularly with respect to diving boats, there has been a trend to provide a plurality of clamps or holders to releasably contain diving gear, including dive tanks, regulators, vests, fins, and the like. Often overlooked is the need to releasably contain spear guns, which typically have a much smaller footprint and diameter than dive tanks and therefore will not fit in dive tank holders or clamps. Because there is a significant safety concern with respect to un-secured spear guns on board a moving vessel, there is a significant need in the art for an improved on-board item holder or clamp that is designed to retain spear guns and like-sized items.

It is, therefore, to the effective resolution of the aforementioned problems and shortcomings of the prior art that the present invention is directed. However, in view of the marine clamps and holders in existence at the time of the present invention, it was not obvious to those persons of ordinary skill in the pertinent art as to how the identified needs could be fulfilled in an advantageous manner.

SUMMARY OF THE INVENTION

A spear gun storage holder for a marine vessel comprising a mounting track that connects to a marine vessel, a spear gun body holding clamp device including a support clamp member and a pivoting clamp member, the support clamp member and the pivoting clamp member defining a clamp opening that releasably receives one or more items such as a spear gun body. A mounting support block extends from the rear of the support clamp member. A pressure spring is disposed between an outside wall of the pivoting clamp member and the support block to bias the clamp in a closed mode or position. The pivoting clamp member pivots to a closed position with respect to the support clamp member under spring tension and the spring pressure provides for closure of the clamp.

A pivot pin is attached through a proximal end of the pivoting clamp member, allowing the pivoting clamp member to pivot with respect to the support clamp member. The spring applies a force against the pivoting clamp member in order to releasably retain the spear gun body in the clamp. The device holding clamp is attachable to an anchor lock block and the anchor lock block is slidingly received in a mounting track attached to a marine vessel such that the device holding clamp is moveable and adjustable with respect to the mounting track. The inside walls of the support clamp member and the pivoting clamp member receive rubber inserts to achieve a snug fit between the item being secured in the clamp and both of the clamp members. The rubber inserts can be removed to show larger items if necessary.

A strap is connected at one end to the pivoting clamp member and can be connected and fastened to the support clamp as additional security to hold an item in the clamp.

Accordingly, it is an object of the present invention to provide a manually releasable clamp for a marine vessel that receives smaller items such as a spear gun for storage when not in use.

It is another object of the present invention to provide a clamp for a marine vessel that is slidingly received in a universal mounting track for enhanced storage stability of the spear gun.

In accordance with these and other objects which will become apparent hereinafter, the instant invention will now be described with particular reference to the accompanying drawings.

DETAILED DESCRIPTION

Figure 1:
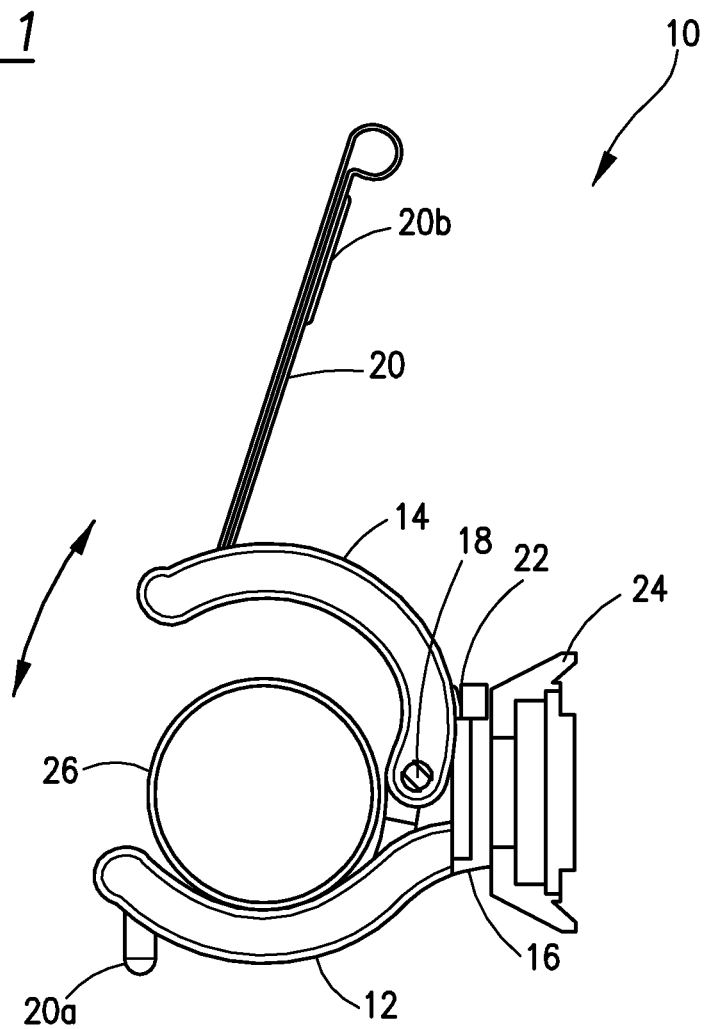
FIG. 1 is a top view of one embodiment of the device holding clamp of the present invention.

FIG. 1 is a top plan view of one embodiment of the spear gun marine vessel clamp 10 of the present invention. Shown is a device holding clamp 10 having a generally circular configuration comprising a fixed semi-circular arm acting as the support clamp member 12 and a pivoting movable semi-circular arm acting as a pivoting clamp member 14. The pivoting clamp arm 14 rotates with respect to the generally static support fixed arm 12. A clamp mounting block 16 extends from the rear of the fixed clamp arm 12. The support mounting block 16 retains a pivot pin 18 to which the pivoting clamp arm 14 is attached and rotates about. A compression spring 22 is mechanically disposed between the outside surface of the pivot clamp arm 14 and the support mounting block 16 which provides constant spring force to a closed clamp position for resilient closure of the clamp 10 as further described below. FIG. 1 also shows an item 26 (such as a spear gun or tubular shaped object) supported within the clamp 10, although pivot clamp arm 14 is shown in an open position. Further shown is an item security strap 20 with fastener 20b that engages strap post 20a. The strap 20 is attached at one end toward the distal end of the pivot clamp arm 14 and provides additional closure and security as further described.

Figure 2:
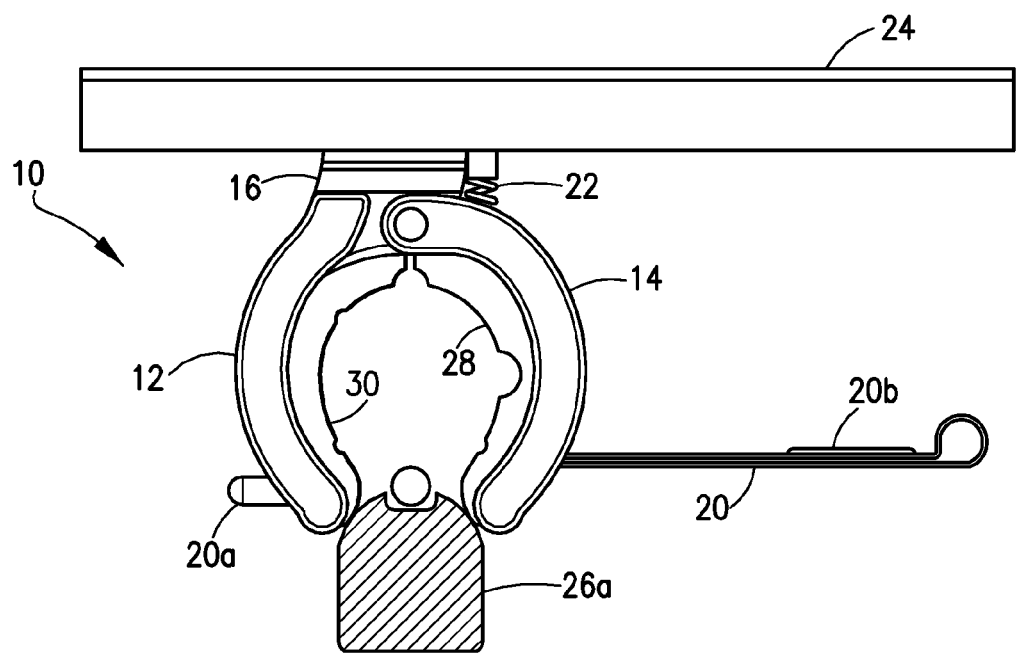
FIG. 2 is another top view of one embodiment of the clamp of the present invention.

FIG. 2 depicts the clamp 10 of the present invention shown as receiving a spear gun 26a for securement. In some embodiments, the interior walls of the clamp fixed arm 12 and pivotal arm 14 include attached flexible pre-molded resilient inserts 30 and 28 respectively which provide a resilient barrier between the clamp fixed and pivotal arms 12 and 14 and an item 26a secured therein and further provide a tight fit, to reduce potential slippage, and to protect delicate spear gun surface finishes such as varnished wooden version 26a during insertion, storage and removal. The inserts 28 and 30 can be made of a suitable resilient material such as rubber. In some embodiments, the inserts 28 and 30 may include one or more pre-molded surface configuration forming positioning register reliefs which accommodate varying sized items, include spear guns, and will accommodate the peripheral configuration and the geometry of such items in order to provide a more secure fitment between the clamp 10 and the secured item. The insert 28 and 30 can be removed to slow larger sixed items as shown in FIG. 1. The pivoting clamp member can be manually opened to insert larger item that may not fit when clamp is closed.

Also shown in FIG. 2 is the spring 22 in its deployed position wherein the spring 22 exerts a force against the movable pivot clamp arm 14 such that the clamp movable arm 14 is brought toward the fixed arm 12 to a closed position. As the spear gun 26a or other item is inserted manually into the opening of the clamp 10, the movable pivot clamp arm 14 will deflect outwardly and press against the spring 22 which manual action opens the clamp 10 to receive the item. Once the item is fully received in the clamp, the force of the spring 22 causes the movable pivot clamp arm 14 to rebound toward the fixed clamp arm 12 closing the clamp opening and securing the item 26a within the clamp 10. The strap 20 is shown in its unsecured state. In some embodiments, the strap 20 is configured to wrap around the clamp opening and its distal end is secured to the strap post 20a, through strap fastener 20b, providing additional securement of the clamp 10 around its retained item. A mounting track 24 that is attachable to a vessel bulkhead receives the mounting block 16 that allows the clamp to be moveably attached to a vessel in a track.

Figure 3:
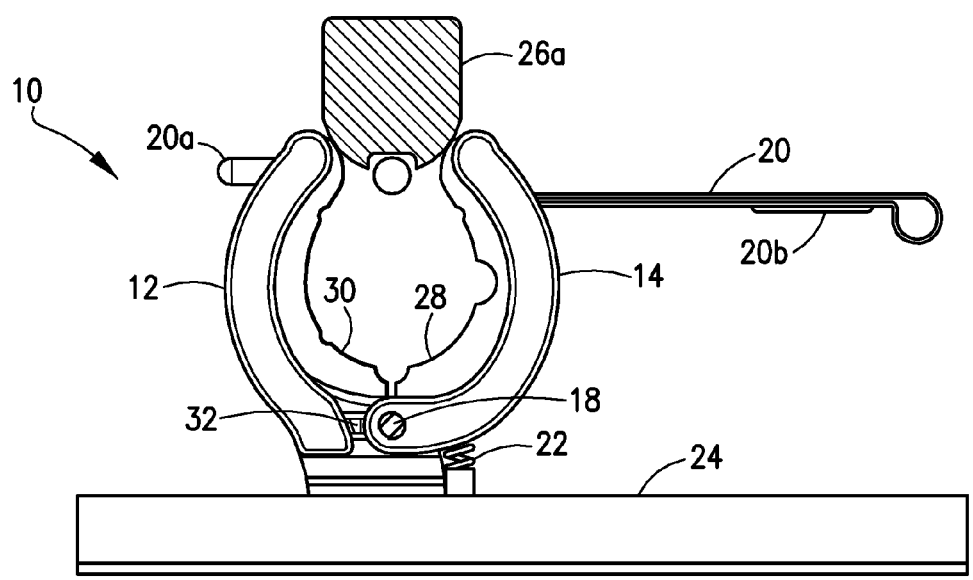
FIG. 3 is a bottom view of one embodiment of the clamp of the present invention.

FIG. 3 depicts the bottom plan view of the clamp 10 of the present invention. Shown is an additional feature, the return stop leg 32, which is disposed on the proximal end of the pivot movable clamp arm 14. The return stop leg 32 limits the range of motion of the movable clamp arm 14 by being configured to press against the inside wall of the fixed clamp arm 12 as the movable clamp arm 14 pivots inward during closure of the clamp 10. This prevents excess tightening of the clamp 10 which would otherwise damage a spear gun 26 or other item held within the clamp. The return stop leg 32 also prevents excess deflection of the movable clamp arm 14 during operation of the vessel, particularly when the vessel is experiencing g-forces by moving erratically such as in high seas or the like. The return stop leg sets the correct opening gap between inserts 28 and 30 for the rectangular-shaped spear gun 26a to be pushed in under the spring force of spring 22 on arm 14. Once the spear gun 26a is captured, return stop leg 32 lifts away from arm 12.

Figure 4A:
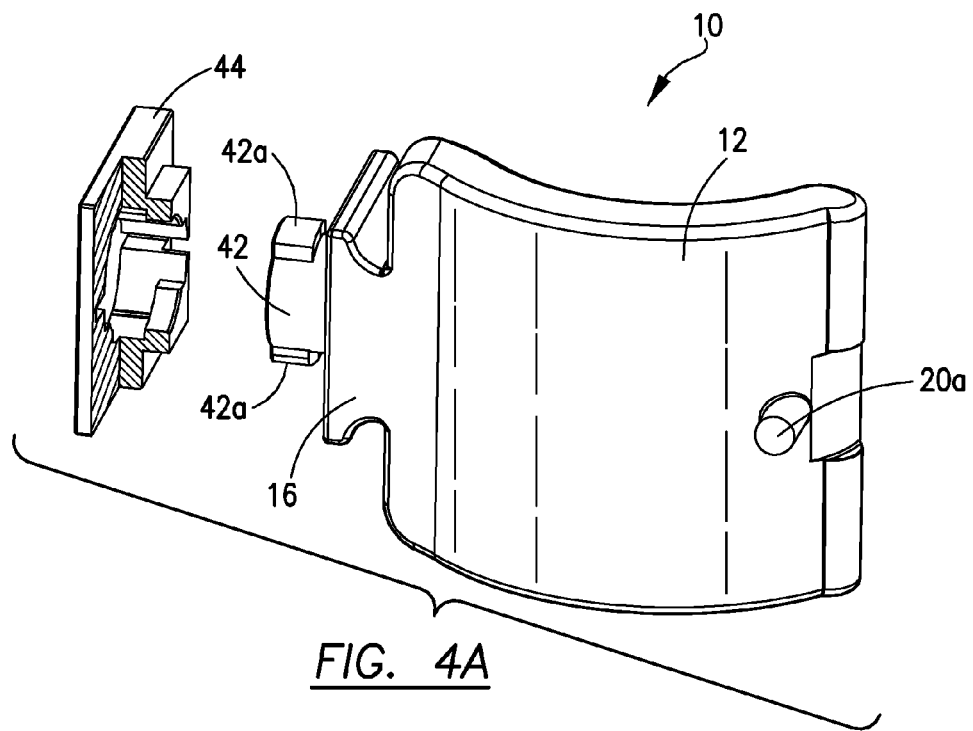
FIG. 4A is a front perspective view of partially exploded and partially in cross section of the support fixed arm of the clamp of the present invention.
Figure 4B:
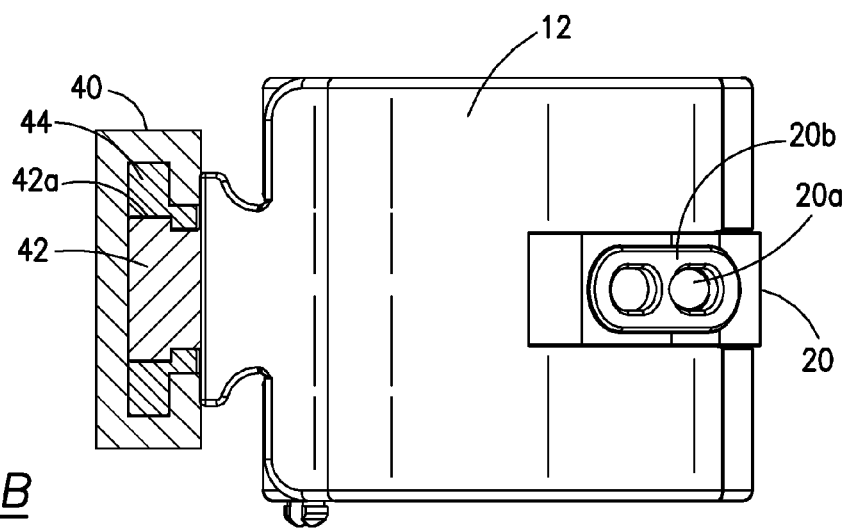
FIG. 4B is a side elevational view of the clamp shown in FIG. 4A with the strap in place.
Figure 5:
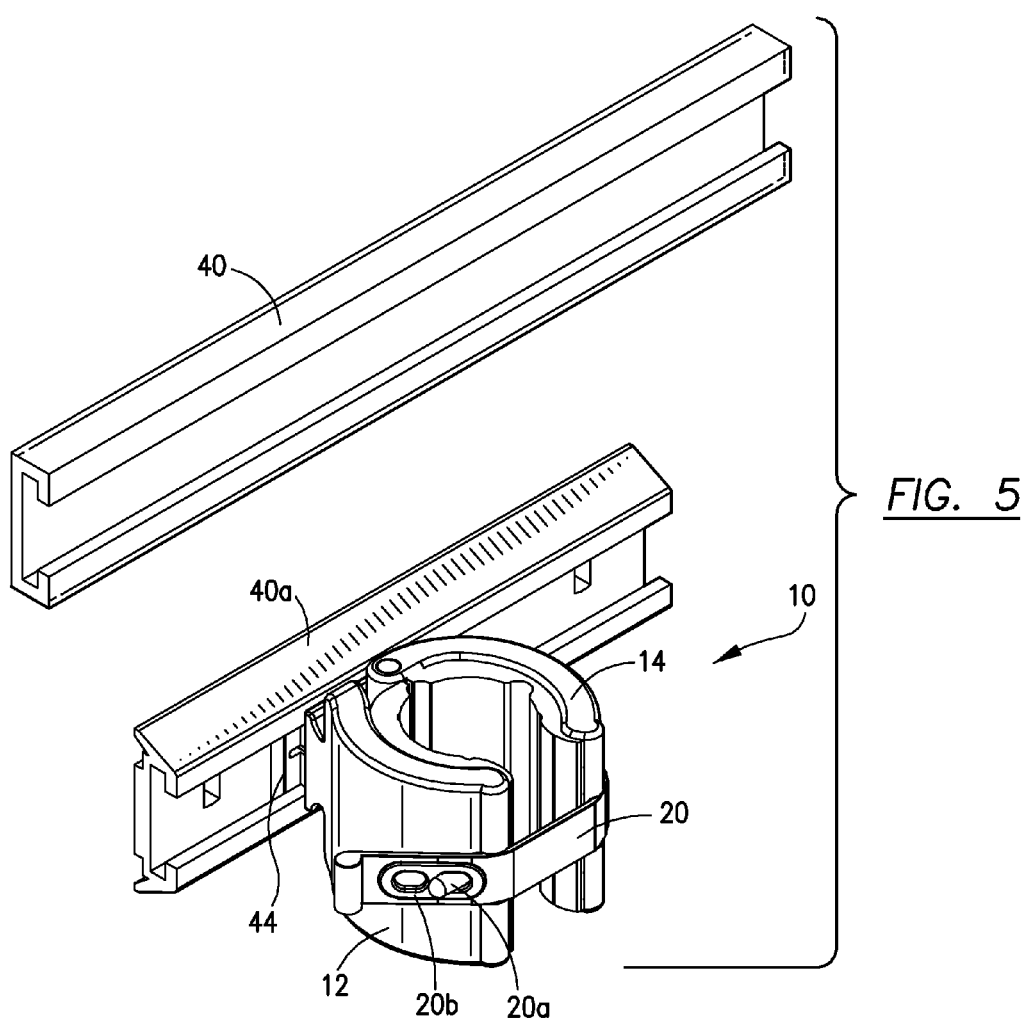
FIG. 5 is a perspective view of one embodiment of the clamp of the present invention partially exploded with an additional mounting bar.

With reference to FIG. 4A, FIG. 4B, and FIG. 5, the clamp 10 of the present invention is configured to be received in a mounting track 40, which track 40 is installed along a bulkhead gunwale or other bulkhead surface of a marine vessel. In some embodiments, extending rearward from the support block 16 are keyed protrusions 42 and 42a which are configured to engage an anchor lock block 44 which provides load bearing faces to retain the clamp 10. In some embodiments, the keyed protrusions 42 and 42a are configured to releasably engage the anchor lock block 44 to allow for quick connection and removal of the entire clamp 10 from a mounting track 40 as desired (FIG. 4B).

The anchor block 44 has a female opening of a specific shape and an internal chamber for receiving the clamp mounting element 42 and upper and lower protrusions 42a. In order to attach the clamps 10 to the anchor block 44, the mounting element 42 and protrusions 42a are initially aligned with the female opening of anchor lock block 44. The mounting element 42 and protrusions 42a are manually inserted into the female opening in the anchor block 44 and rotated into a locked position shown in FIG. 4B. The anchor block is configured peripherally to fit in a vessel mounting track 40 as shown in FIG. 4B. The clamp 10 can be attached or removed from the mounting track 40 as desired. Accordingly, with reference to FIG. 4B, the mounting track 40 receives the anchor lock block 44 which anchor lock block 44 receives two keyed protrusions 42a of the clamp by rotation. FIGS. 4A and 4B also demonstrate the interaction between the various load/pull/push faces of the keyed protrusion and the anchor lock block 44.

With reference to FIG. 5, a generic "C" shaped mounting track 40 is shown. A specific mounting track 40a may generally have a C-shaped cross-section. The modified mounting track 40a can be rigidly fixed to a marine vessel bulkhead (not shown) or other surface. The mounting track 40a interior passage is configured to receive the anchor lock block 44, which has corresponding peripheral geometry that permits movement of anchor lock block 44 in track 40a. The anchor lock block 44 therefore slides within the mounting track 40a for positioning as desired. The anchor lock block 44 receives the keyed protrusions 42 and 42a (FIG. 4A) of the clamp and therefore the clamp 10 slidingly engages the mounting track 40a for versatile and modular storage of a variety of items. FIG. 5 also depicts the clamp 10 in its closed position, with the strap 20 disposed around and closing the clamp opening, providing for resilient closure of one or more items within the clamp.

The strap 20 includes a fastener 20b with two holes for length adjustment to secure clamp 10 in a closed position to prevent an item secured in clamp 10 from accidental removal clamp 10 by exterior forces exceeding spring force on movable clamp arm 14. Strap locking post 20a is received through fastener 20b for holding the strap in place.

It is appreciated that the present invention and its constituent parts can comprise any desired materials or combination of materials such as metals, plastics, resins, and combinations thereof. Because the present invention is particularly useful on marine vessels, it would be desirable to select materials that are relatively corrosion resistant and which are prone to surface reaction or interaction in the presence of a corrosive environment. It is further appreciated that the mounting track of the present invention is configured to receive a plurality of storage accessories in addition to the clamp of the present invention such that the clamp can be used adjacent to item holders or retainers of varying sizes. Thus, in one example, a spear gun may be resiliently retained adjacent to a scuba tank with the spear gun being more easily retained in the properly sized clamp 10 of the present invention, instead of the much too large scuba tank holder. Further still, the sliding action of the clamp within the mounting track, by way of the anchor lock block, renders the present invention particularly useful, modular, and versatile.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A spear gun storage holder for a marine vessel comprising:
   a clamp mounting track for attachment to a vessel bulkhead;
   an anchor lock block slidely mounted in said mounting track;
   spear gun holding clamp;
   mounting support block connected to said spear gun holding clamp;
   said spear gun holding clamp including a fixed clamp arm and a pivoting movable clamp arm, wherein the fixed clamp arm and the pivoting movable clamp arm define a clamp configured in the closed positions to secure a spear gun;
   said mounting support block extending from said fixed clamp arm;
   a spring disposed between an outside wall of the pivoting movable clamp arm and the mounting support block;
   the pivoting movable clamp arm being pivotably moveable with respect to the fixed clamp arm; and
   the spring engageable for resilient closure of the fixed clamp arm and the moveable clamp arm.

2. The clamp of claim 1 further including a pivot pin attached through a proximal end of the pivoting movable clamp arm, allowing the pivoting movable clamp arm to pivot with respect to the fixed clamp arm.

3. The clamp of claim 1, wherein the spring applies a force against the pivoting movable clamp arm in order to releasably retain a spear gun in the clamp.

4. The clamp of claim 1, wherein the inside walls of the fixed clamp arm and the pivoting movable clamp arm receive removable rubber inserts.

* * * * *